Jan. 5, 1954               J. V. RIVA               2,665,036
DEVICE FOR DOSING POWDERED OR GRANULAR SUBSTANCES HAVING
DISPENSING CONDUIT WITH A VIBRATION-PRODUCING
MEMBER CARRIED THEREBY
Filed Feb. 23, 1950
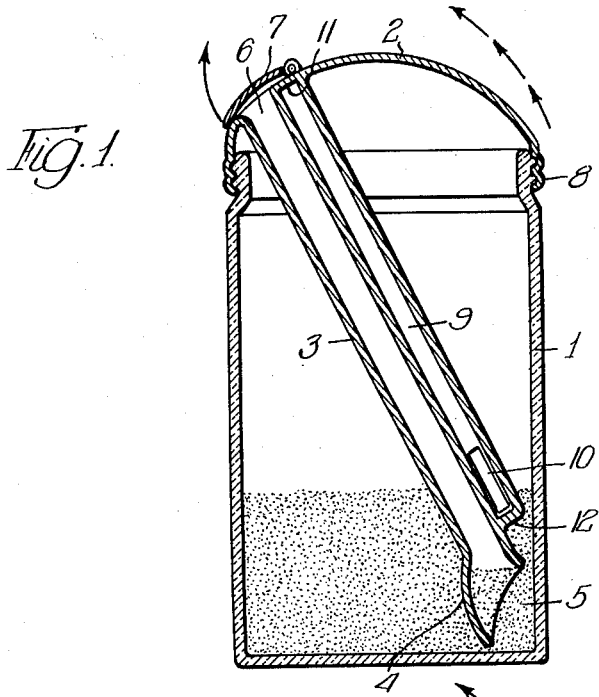
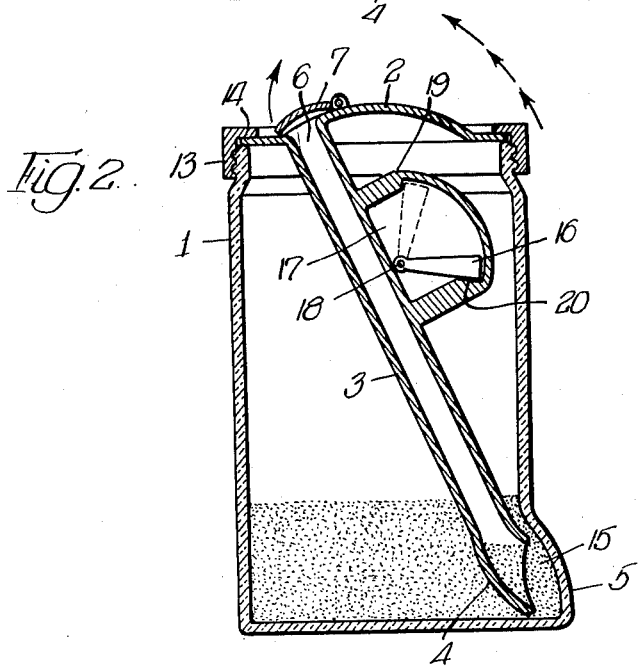
INVENTOR.
Jose Victorio Riva,
BY Patented Jan. 5, 1954

2,665,036

UNITED STATES PATENT OFFICE 2,665,036

DEVICE FOR DOSING POWDERED OR GRANULAR SUBSTANCES HAVING DISPENSING CONDUIT WITH A VIBRATION-PRODUCING MEMBER CARRIED THEREBY

José Victorio Riva, Buenos Aires, Argentina

Application February 23, 1950, Serial No. 145,740

6 Claims. (Cl. 222—196)

The present invention refers to improvements in devices for dosing substances in powder or granular form.

More particularly it is related to improvements in dosing devices of the type comprising a container holding the substance to be closed and which is provided with a conduit for extraction which has its inner end equipped with a dosing receptacle.

This type of apparatus as well as its applications in the various cases in which it becomes necessary to dose substances in powder or granular form are already known, its application being specially known in the case of sugar-basins containing powdered sugar. However, both in the case of the sugar-basins and in that of other similar powdered substances, it appears that the device is seriously handicapped in operation due to the substance to be dosed sticking to the walls of the extraction conduit whereby the latter becomes choked or the substance is not allowed to slip with the necessary swiftness through the said conduit to finally issue from the outlet.

Therefore, the inventor has looked out for a manner of eliminating these drawbacks by means of a simple and efficiently operating mechanism which constitutes the object of the present invention.

This invention comprises a moving piece lodged inside a cavity forming one unit with the extraction conduit, said piece being capable of moving between the two outer positions as determined by the corresponding stops.

In this manner the inclination movements required for the operation of the dosing device will bring about the movement of the slidable piece which on kicking against the stops determining its outer positions will cause the extraction conduit and other neighbouring portions to vibrate. Thereby not only a quicker circulation of the powder or granular substance inside the said conduit will be obtained, but also will its particles take off from the inner surfaces, while the substance housed inside the device will more readily slide towards the dosing receptacle inlet.

The mechanism intended to produce vibration of the extraction conduit may have different constructional shapes, such as that of a free body inside an elongated cavity or that of a rotatable piece supported by its corresponding shaft, etc., but the moving piece must be allowed in any case to slide between two outer positions bumping against one of them at the end of its travel.

Eventually, this mechanism may comprise more than one moving piece lodged in one and the same or in just as many cavities as there are moving pieces, and of such a shape that by virtue of the location of their pathways or by virtue of different degrees of swiftness imparted by their guiding means, the corresponding clashes will take place one after the other with the object in mind of obtaining a more suitable result.

Thus, in the case of two pieces sliding along an elongated cavity, two pieces of different size lodged in one and the same cavity may be provided, so that one of them slides quicker than the other one, or the two pieces may be housed in individual cavities extending in a different angular direction with respect to the extraction conduit, etc.

Other characteristics and constructional details of this invention may be appreciated by the aid of the drawings accompanying this description and wherein two preferred embodiments of the fundamental idea are shown which, of course, may be changed. I am going to refer to these drawings hereinafter with the purpose of amplifying and clearing up what has been said before, whilst, at the same time, pointing out the feasibility of putting the invention into practice.

Fig. 1 is a vertical central section through a dosing apparatus constructed according to the invention and wherein the mechanism producing the vibrations is constituted by a loose piece lodged inside an elongated cavity forming one piece with the extracting conduit.

Fig. 2 is also a vertical central section showing another embodiment of the invention wherein the piece producing the vibrations spins between two outer positions, being sustained by a shaft.

In this description numerals are employed to identify the different members of the unit, when it should be understood that equal numerals, even when appearing in different figures, indicate equal or equivalent members.

The container 1 has a lid 2 wherewith the extracting conduit 3 forms one sole piece. The inner end of conduit 3 is provided with a dosing receptacle 4 whose inlet is opposite zone 5 of the bottom of container 1, said zone being diametrically opposite that of the outlet 6 of conduit 3. Outlet 6 is equipped with a lid 7 hingedly secured thereto.

In the case of Fig. 1, the lid 2 is made of a sole piece threaded at 8 to container 1. The elongated cavity 9 which is parallel to conduit 3 houses a loose piece 10 capable of longitudinally sliding in both directions, its movements being limited by the outer stops 11 and 12.

In the case of Fig. 2, the lid 2 is secured to the upper opening of receptacle 1 by means of the threaded sleeve 13 equipped with a wing 14, while zone 5 of the bottom of the receptacle 1 has an inner cavity 15 of concave shape.

In this second example of embodiment the moving piece 16 housed inside the cavity 17 is sustained by shaft 18 around which it spins between two outer positions determined by the stops 19 and 20.

The operation of the dosing device is as follows: inasmuch as the dosing receptacle is situated near the bottom of the receptacle containing the substance to be dosed, it is located inside the latter when the receptacle stands in its normal position; when the container is taken up with the hand and inclined to extract a dose, the commencement of the inclination movement gives rise to the substance moving towards the upper zone of the container, excepting the portion that is retained in the dosing receptacle which, when the inclination movement goes on, will then pass on to the extracting conduit and through the outlet to the outside. Brought back to its normal position, the repetition of the inclination movement of the container will bring about the exit of a new dose of substance, and so on. On the other hand, with each inclination movement and return to the normal position of the container, the moving piece will slide from one of its outer positions to the other kicking against the corresponding stops and causing vibration of both the extracting conduit and its neighbouring portions.

It is desired to point out that the foregoing description refers to one of the preferred embodiments without thereby limiting the invention which is thereby described by way of example only, when different modifications of shape, construction and detail may be introduced without thereby departing from the scope of the present invention which is clearly ascertained in the appended claiming clauses.

I claim:

1. In a device of the class described comprising a container adapted to contain a dispensing substance, a lid for the container, a dispensing conduit positioned in said container and opening through said lid, a measuring trap on the lower end of said conduit communicating with the interior of said container, a closed chamber positioned laterally of and carried by said dispensing conduit, said chamber being confined wholly within said container, and a movable member confined in said closed chamber operable to produce vibrations in said dispensing conduit to facilitate dispensing of the substance therefrom.

2. The device of claim 1, wherein the movable member confined in the closed chamber has translational movement for the full length of the chamber.

3. The device of claim 1, wherein the closed chamber is positioned laterally of and carried by the dispensing conduit and extends for substantially the full length thereof.

4. In a device of the class described comprising a container adapted to contain a dispensing substance, a lid for the container, a dispensing conduit positioned in said container and opening through said lid, a measuring trap on the lower end of said conduit communicating with the interior of said container, a closed chamber positioned laterally of and carried by said dispensing conduit, said chamber being confined wholly within said container, and a member movable through the arc of a circle sector and confined in said closed chamber operable to produce vibrations in said dispensing conduit to facilitate dispensing of the substance therefrom.

5. The device of claim 4, wherein the member movable through the arc of a circle sector comprises an arm pivoted at one end on said conduit for swinging movement in said chamber.

6. The device of claim 5, wherein the chamber is provided with a pair of spaced apart shoulders for limiting the swinging movement of said arm.

JOSÉ VICTORIO RIVA.

References Cited in the file of this patent

UNITED STATES PATENTS

| Number | Name | Date |
| --- | --- | --- |
| 737,267 | Overbaugh | Aug. 25, 1903 |
| 846,256 | Smith | Mar. 5, 1907 |
| 1,622,318 | Janer | Mar. 29, 1927 |
| 1,941,745 | Higley | Jan. 2, 1934 |
| 1,980,061 | Jackson | Nov. 6, 1934 |